United States Patent
Lahtiranta et al.

(10) Patent No.: US 9,432,830 B2
(45) Date of Patent: Aug. 30, 2016

(54) METHOD OF ADVERTISING USING MOBILE COMMUNICATIONS

(75) Inventors: Atte Lahtiranta, Mountain View, CA (US); Jari P. Hamalainen, Kangasala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 978 days.

(21) Appl. No.: 11/468,207

(22) Filed: Aug. 29, 2006

(65) Prior Publication Data

US 2008/0057915 A1 Mar. 6, 2008

(51) Int. Cl.
*H04W 24/00* (2009.01)
*H04W 4/24* (2009.01)
*H04M 15/00* (2006.01)

(52) U.S. Cl.
CPC ............... *H04W 4/24* (2013.01); *H04M 15/00* (2013.01); *H04M 2215/0192* (2013.01); *H04M 2215/2026* (2013.01)

(58) Field of Classification Search
CPC ................. H04W 4/24; H04M 15/00; H04M 2215/0192; H04M 2215/2026
See application file for complete search history.

(56) References Cited

U.S. PATENT DOCUMENTS

| | | | |
|---|---|---|---|
| 6,493,437 B1 | 12/2002 | Olshansky | |
| 6,947,531 B1* | 9/2005 | Lewis et al. | 379/114.13 |
| 7,010,293 B2* | 3/2006 | Go | 455/414.3 |
| 7,707,065 B1 | 4/2010 | Kangas | |
| 8,086,489 B2* | 12/2011 | Ramakrishna | 705/14.4 |
| 2002/0077130 A1 | 6/2002 | Owensby | |
| 2004/0054576 A1 | 3/2004 | Kanerva et al. | |
| 2004/0224705 A1 | 11/2004 | Nishimura | |
| 2005/0192861 A1* | 9/2005 | Nakazawa et al. | 705/14 |
| 2006/0094406 A1* | 5/2006 | Cortegiano | 455/414.1 |
| 2007/0081662 A1* | 4/2007 | Altberg et al. | 379/355.03 |
| 2007/0116227 A1* | 5/2007 | Vitenson et al. | 379/207.02 |

FOREIGN PATENT DOCUMENTS

| | | | |
|---|---|---|---|
| AU | 7294700 A | | 4/2001 |
| BR | 0014032 A | | 5/2002 |

(Continued)

OTHER PUBLICATIONS

Chinese Office action for corresponding CN application No. 200780032458.3 dated Apr. 26, 2011, pp. 1-15.

(Continued)

*Primary Examiner* — Ajit Patel
(74) *Attorney, Agent, or Firm* — Ditthavong & Steiner, P.C.

(57) ABSTRACT

A system and method is constructed to provide financing of mobile communications by sponsors in return for permitting the dissemination of advertisements before, during, or after a particular call. The system includes a location server through which communication channels can be established, mobile communication terminals inter connected for communication over the communication channels established by the location server, a sponsor server having a memory in which is stored advertisements, and an application module resident on the sponsor server, mobile communication terminal, or location server to control a communication from one of the mobile communication terminals to another of the mobile communication terminals to, at the request of a user of the mobile communication terminal, place advertisements from the sponsor server into the communication and charge the cost of the communication to the sponsor server.

36 Claims, 5 Drawing Sheets

(56) References Cited

FOREIGN PATENT DOCUMENTS

| | | | |
|---|---|---|---|
| CN | 1376286 A | 10/2002 | |
| CN | 1484924 A | 3/2004 | |
| CN | 1551606 A | 12/2004 | |
| EP | 1236136 A1 | 9/2002 | |
| EP | 1356695 A1 | 10/2003 | |
| EP | 1477918 A2 | 11/2004 | |
| FI | 992084 A | 3/2001 | |
| FI | 20002872 A | 6/2002 | |
| JP | 2004336581 A | 11/2004 | |
| WO | WO 0124071 A1 | 4/2001 | |
| WO | 01/71949 A1 | 9/2001 | |
| WO | WO 02054803 A1 | 7/2002 | |
| ZA | 200201753 A | 12/2003 | |

OTHER PUBLICATIONS

Chinese Office action for corresponding CN application No. 200780032458.3 dated Dec. 7, 2010, pp. 1-12.

Canadian Office Action for corresponding Canadian Patent Application No. 2,661,073 dated Dec. 8, 2011, pp. 1-3.

ESO for corresponding European Patent Application No. EP 70 80 4800, pp. 1-3. (No date.).

Supplementary European Search Report for corresponding European Patent Application No. EP 07 80 4800 dated Feb. 17, 2012, pp. 1-2.

Office Action for corresponding Canadian Application No. 2,661,073, dated Aug. 13, 2013, 4 pages.

Office Action for corresponding Canadian Application No. 2661073, dated Nov. 18, 2014, 5 pages.

* cited by examiner

METHOD OF ADVERTISING USING MOBILE COMMUNICATIONS

BACKGROUND

1. Field

This application relates to mobile communications based advertising. More particularly it relates to a method by which a user's mobile communications can be financed through third party advertising.

2. Brief Description of Related Developments

Advertising, coupled with the Internet, has spawned a wide variety of programs through which various applications, services, and information may be obtained by a user in return for permitting advertisements to be received on the users device as part of such programs. Generally such devices have been PC based. With the introduction of more powerful mobile communications devices, such as cellular telephones, personal digital assistants (PDA) and other devices, including multi-media computing devices, these programs are available on a real time basis using mobile communication services.

There is a continuing quest by marketeers of all kinds to obtain more direct and focused access to consumers. There is a proliferation of web sites financed by pop-up ads, marketing surveys, and other similar methods by which advertisers may reach the ever expanding computer user population. Attention is now being directed to another user group represented by the mobile phone user. Access to this group is expanding based on the availability of Internet access and other channels of communication.

At the present time, mobile communications are financed using a transaction model that allocates cost, usually on a per minute price basis or per message basis, between the caller and call receiver. Since the call receiver generally shares in the cost of a communication, they are given significant control of access to their phone. This limits the use of the popular telemarketing schemes that are well established in land line based communications. It would be advantageous to provide a means by which a sponsor could obtain permission to insert ads within the context of a mobile communication.

An assortment of communication modes and related protocols are available for facilitating the distribution of advertisements as part of a mobile communication. Such modes and protocols have emerged from instant messaging applications and others. Communication modes that are derivative of instant messaging services have expanded and now include: chat capability, voice capability, text messaging, email, and other modes. Such modes and protocols are generally made available through the mobile communications network server. It is a purpose of the methods, systems, devices, and software products of this application to provide means to adapt any or all of these modes of communications so that they may be used to generate a mobile communication suitable for the distribution of advertising in return for the sponsor financing of the communication.

Other Internet based protocols, such as those that enable establishment of communication sessions between two (or more) parties, e.g. Jabber/XMPP (extensible messaging and presence protocol), (IETF standard) for example: RFC 3923, 3922, 3921, and 3920, SIP (session initiation protocol, IETF RFC 3161, 3GPP, OMA standard), and other proprietary protocols, such as IP Multimedia System (IMS), 3GPP 23.228, which shall be referred to in general as "presence based" protocols, may be particularly adaptable to advertising based financing. It is a purpose of the methods, systems, devices, and software products of this application to provide means to adapt any or all of the presence based modes and mobile communication service related protocols so that they may be used to generate a mobile communication suitable for the distribution of advertising in return for the sponsor financing of the communication.

SUMMARY

In one embodiment of the system and method of this application, financing of mobile communications is provided by sponsors in return for the user permitting the dissemination of advertisements as part of a particular communication.

In another embodiment of the method, the communications are internet based calls, using presence based protocols, such as voice over Internet protocols (VoIP) and session based protocols, such as session initiation protocols (SIP).

In another embodiment of the method, the calls may be direct calls through a mobile communications server in which application software, including sponsor advertisements, programs to permit insertion of the advertisements into a communication and billing activation is resident on one of the location server, sponsor server, and mobile communication terminal.

In another embodiment of the system, the sponsor financed calling application could be resident on the mobile communication device and accessed as an option during call initiation. The application could be a feature supplied with the communication device or downloaded at the option of the user.

In one embodiment, a system is constructed to implement an application which permits advertisements from an accepted sponsor to be inserted into a mobile communication in return for sponsor financing of the communication. An application module is constructed to insert the advertisements into a communication and bill the sponsor. This may be accomplished by a prearranged subscription with a sponsor or on a call by call basis initiated by the caller, sponsor or server.

In one embodiment the sponsor financed application software product would be resident on an Internet server. In another embodiment the application would be resident on a mobile communication network server. In another embodiment the application would be resident on the mobile communication terminal.

BRIEF DESCRIPTION OF THE DRAWINGS

The method of this invention is explained in more detail below with reference to the accompanying drawing, in which.

DESCRIPTION

A method and system adapted to distribute advertising using mobile communications is illustrated in the figures. Although the disclosed embodiments will be described with reference to the embodiments shown in the drawings, it should be understood that the present invention may have many alternate forms. In addition, any suitable size, shape or type of elements or materials could be used.

Figure 1:
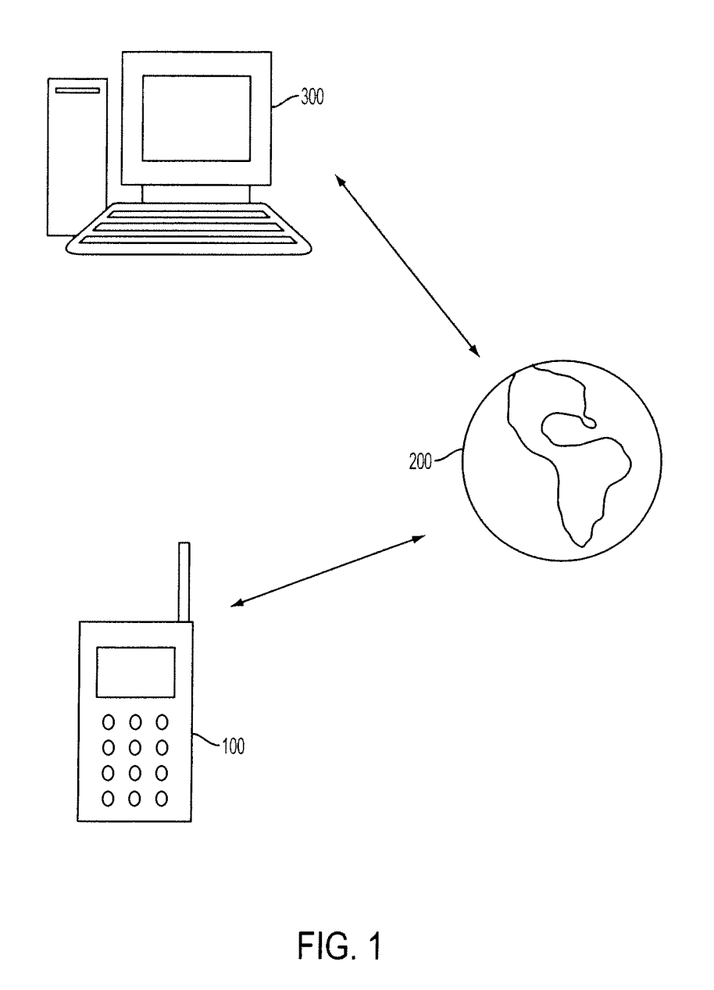
FIG. 1 schematic diagram of a communication system through which an embodiment of the method of this application may be implemented.
Figure 2:
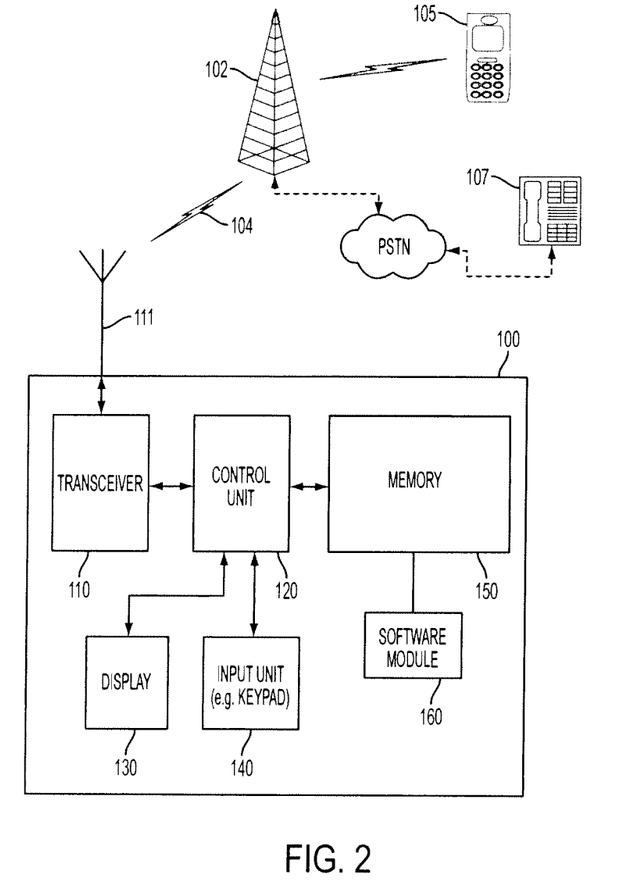
FIG. 2 is a schematic diagram of a local mobile communication system through which an embodiment of the method of this application may be implemented.

FIG. 1 shows a system for world wide communications including a mobile communications terminal 100, location server 200 and sponsor server 300. Mobile communications terminal 100 can be any terminal that functions as a communication device, such as a cellular telephone, PDA, pager, multi-media computer and other similar devices and combinations. A typical communication device 300 includes a local communications system and internal components an example of which is shown in FIG. 2. The communication system may have a multiradio capability, such as WLAN, WiMAX, etc. for direct connection to the internet or by telco operators network. Location server 200 represents a radio communications network server or an Internet server on which applications can be resident and connections may be completed between the mobile communications device and other communications devices. Sponsor server 300 may be a local area network server, functioning as part of an enterprise, an individual personal computer or other similar device or combination of devices on which advertisements may be stored and communications may be established with the location server 200. Such servers could be controlled by a telecommunications operation in conjunction with the network server or other access point.

A local mobile communication network for mobile communication device 100, which could be for example, a cellular telephone, PDA, or other type of device using mobile communication services is shown in FIG. 2.

FIG. 2 is a schematic block diagram of a mobile telecommunication terminal 100 according to an embodiment of the present invention. A transceiver 110 is used for communicating with a base station 102 via an antenna 111. The base station 102 is in communication with other mobile telecommunication terminals 105 via a mobile communications network, and stationary terminals 107 via e.g. a public switched telephone network (PSTN). The terminal 105, may be any type of communication devices adapted to utilize mobile communication services, such as PDA's, pager, multi-media computer and the like. The terminals 105 and network are generally adapted to support IP traffic, for example, WLAN, broadband (BT), IP-Pass-through, cellular (e.g. GSM, GPRS) and others.

Within mobile communication device 100, a control unit 120 is coupled to the transceiver 110. The control unit 120 may comprise signal processing circuitry in order to process e.g. voice data and message data (e.g. SMS MMS, or IM/Presence) from a user/sender of the mobile telecommunication terminal 100 and provide the transceiver 110 with the processed data for transmission to the base station 102. Likewise, the control unit 120 may comprise signal processing circuitry for processing data received from the other telecommunication terminals 105, 107, sponsor server 300, and location server 200 in order to provide the user of the mobile telecommunication terminal 100 with e.g. audio, image, video or message data. Alternatively (not shown) some or all of the signal processing functionality may be provided by specialized circuitry in the mobile telecommunication terminal 100.

The control unit 120 is coupled to a display 130 for providing a user of the mobile telecommunication terminal 100 with visual data regarding e.g. a specific call in progress, telecommunication numbers stored in the mobile telecommunication terminal 100, signal strength of the wireless communication link 104, messages received from other mobile telecommunication terminals, etc. In particular in accordance with the system described in this application, the display may be adapted to present advertising. Audio portions of multi-media ads would make use of a microphone or speaker provided at the mobile communication terminal 100.

The control unit 120 is moreover coupled to an input unit 140, which may be in the form of a keyboard/keypad; an on-screen touch-sensitive keyboard; a navigation wheel or joystick for scrolling and selecting items, digits and/or characters shown on the display 120; etc. A memory 150 is connected to the control unit 120.

The memory 150 may be a single memory or many different memories implemented on different chips, alone or together with other electronic circuitry, by means of different technologies (such as RAM, ROM, EPROM, EEPROM, Flash, etc) which all are accessible by the control unit 120.

A mobile communications device of this basic kind is well-known in the art and there is no need for any further detailed description of the basic features of the mobile communications device.

According to an embodiment of the system of this application, control unit 120 executes software contained in a software module 160. A sponsor advertising package forms part of software module 160 and includes application software for initiating sponsor financed communications and enabling the insertion of selected advertisements into the sponsor financed communications. A user of the mobile communication device may obtain the sponsor advertising package by solicitation from a sponsor, internet advertisement, communication service provider, Internet service provider, communication device supplier or other means. It could be downloaded, or provided as part of a smart card or other type of media that may be connected to the mobile communications terminal 100. It may be a service provided by a communications service provider, telecommunications operator, or internet service provider and others and executed on a subscription or call by call basis on the respective server, such as location server 200.

Once the user obtains or connects with the sponsor financed communication/advertising package, a communication can be made according to the needs of the user. In all embodiments of the system of this application, communication financing is provided by sponsors in return for permitting the dissemination of advertisements before, during, or after a particular connection or at other convenient times. Such charges can be applied on a per call, per message, per minute, as a subscription rate or any other convenient standard.

Figure 3:
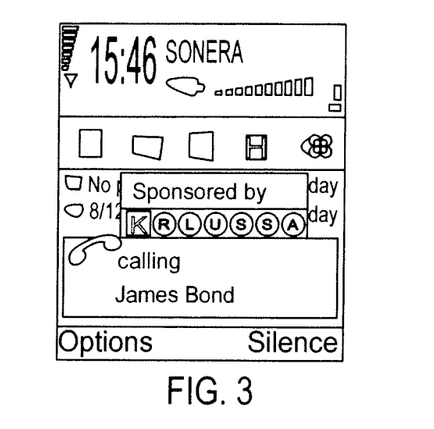
FIG. 3 is an example of a display menu for placing a sponsor financed call.
Figure 4:
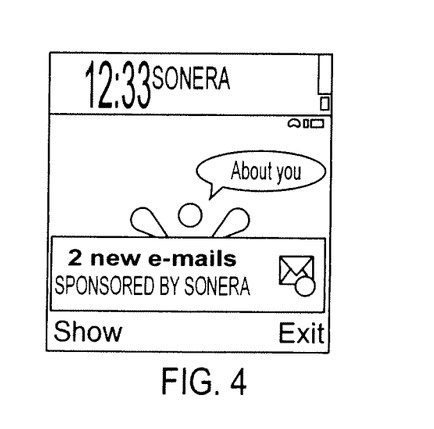
FIG. 4 is an example of a display menu for placing a sponsor financed call.
Figure 5:
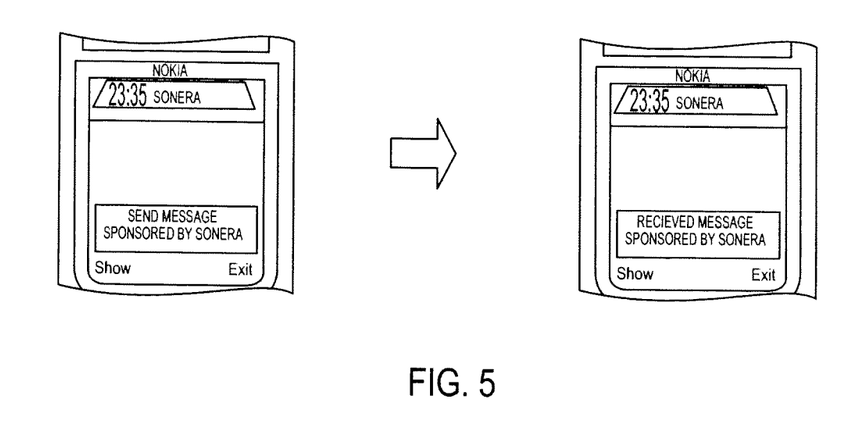
FIG. 5 are illustrations of display screens showing announcements for sending and receiving sponsor financed calls.

The application software provides for the initiation of the communication through a mobile telephone menu, an internet browser menu, a presence or session style menu or other similar means. Examples of the menus and displays associated with sending messages are shown in FIGS. 3 and 5. Examples of menus and displays associated with a receiving message are shown in FIGS. 4 and 5. In all of these displays and menus there is provided space to indicate the sponsor by name, logo or other convenient identifier.

Figure 6:
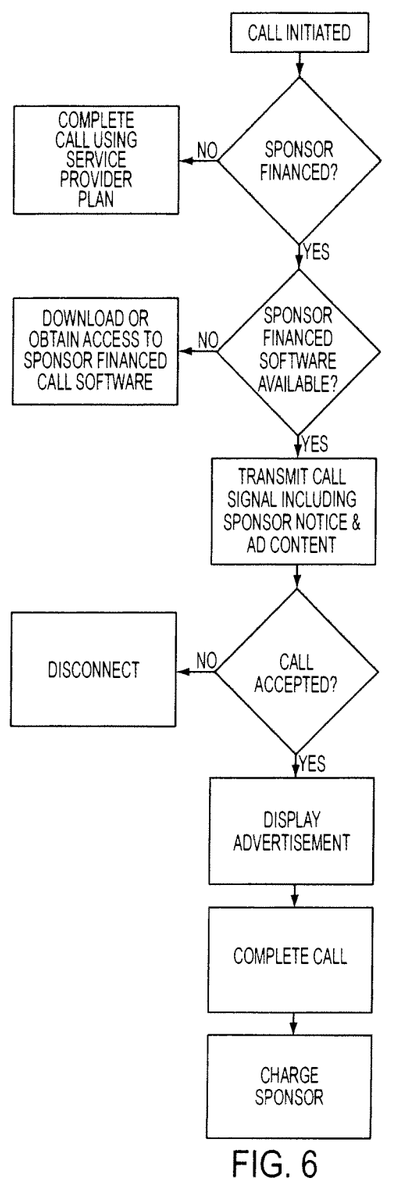
FIG. 6 is a flow diagram of an embodiment of the method of this application.

In one embodiment, the sponsor communication financing application software may be selected as part of a normal communication transaction, as shown in the flow diagram of FIG. 6. When a call, message or other communication is initiated, an option may be presented on a display, for example display 130 in FIG. 2, to allow the selection of a sponsor financed call. Once selected the sponsored financed communication application software may offer specific options for the form, content, length, and placement of the ad within the call. For Example, an ad may be inserted before, during or after a communication connection. The communication is then placed and a connection established. The sponsor software package would select the advertisement and insert it in the selected place in the communication transaction. Depending on the call mode an acceptance maybe necessary, for example, in presence based protocols. Once a sponsored communication is initiated, ad content is transmitted in the communication signaling and the receiver of the communication is notified of the sponsor by displayed logo or other indication. Ad content is displayed after the connection is accepted by the receiver. Upon completion, the cost for the communication is charged to the sponsor. As an added feature, the ad content may also be displayed to the user/sender, when a communication is initiated. The ad content, therefore, may displayed to both the user/sender and the receiver of a communication and triggered by a variety of events.

In applying credits under a sponsored communication program, different models may be used, such as one ad for one communication, an ad for a time period, i.e. one ad/minute, or other convenient model.

In another embodiment, advertisements may be preloaded to the communications terminal, using an appropriate protocol and initiated by installation of the communication sponsored software or other event (updates, etc.). Whenever a new e-mail, SMS or other communication is received, the notification of the connection may include the sponsor advertisement message. The display of an ad could also be triggered by other events, such as, calendar notification, alarm, etc. This type of sponsor communication financing model may be financed by a subscription for a particular term and the advertisements would be displayed automatically for the term of the subscription. This would eliminate the need to select a sponsored communication program as each call is made.

In another embodiment where advertisements may be preloaded to the communication terminal, the ad may be displayed to the user when the user makes an outgoing call. The display of an ad to the user could also be triggered by other events, such as, calendar notification, alarm, etc.

In another embodiment a sponsored based messaging model could be applied to offline messaging. In this instance the program would provide for the display of ads by the receiver, with an incoming message (SMS, MMS, IM, etc.). This could be accomplished on a subscription basis in which an inventory of ads are downloaded to the communication terminal and displayed either to the user/sender or the receiver or both. As in other embodiments the user could access the ads and trigger acknowledgements that would be sent to the sponsor server for credit.

In another embodiment where advertisements are preloaded to the communication terminal, the user may browse the ad content without a triggering event, like, incoming or outgoing calls, calendar alarms and the like. After the user browses a particular ad, an acknowledgement may be indicated by the user pressing a button or other means, for example automatically. The acknowledgement would be sent to the sponsor server, recorded and a credit would be awarded to the user towards a call, message, or other communication.

The advertisements may be multi-media such as video, images, text, logos, or even audio ads associated with receiving a textual message. The advertisements may include attachments, URL information for direct internet access and many other types of content limited only by the capability of the mobile communicator. As the power and sophistication of mobile communication devices expands, such ads may become significant presentations of information and services.

In another embodiment of the method, the calls are internet based calls, using presence based protocols, such as voice over Internet protocols (VoIP) and session based protocols, such as those that enable establishment of communication sessions between two (or more) parties, e.g. Jabber protocol (IETF standard) used in GoogleTalk, SIP (session initiation protocol, IETF, 3GP, OMA standard), and other proprietary protocols.

In another embodiment of the method, the calls may be direct calls through a mobile communications server in which application software, including sponsor advertisements, programs to permit insertion of the advertisements in to a communication and billing activation may be executed on the mobile communication server.

In any of the various types of communications where sponsored communications are enabled, the ad content may be transferred on a real-time basis as part of the signaling initiating a connection and display may be triggered by acceptance of the connection. In another embodiment, the ad content may be preloaded to the communication device upon initiating the sponsored communication application. In this instance display of the ad content may be triggered by a variety of events within the communication device. In some circumstances, the display of an ad may be triggered as soon as the signaling messages with advertisement content is received, i.e. with the call identification.

In another embodiment the sponsor financed communication application may be downloaded to the sending mobile communications terminal and the application software will direct the sending mobile communication terminal to access the sponsor financed communication application and execute a financed communication.

It should be understood that the above description is only illustrative of the invention. Various alternatives and modifications can be devised by those skilled in the art with out departing from the invention. Accordingly, the disclosed embodiments are intended to embrace all such alternatives, modifications and variances which fall with the scope of the appended claims.

We claim:

1. An apparatus comprising:
at least one processor; and
at least one memory including computer program code,
the at least one memory and the computer program code configured to, with the at least one processor, cause the apparatus to perform at least the following,
in response to a request from a mobile communication terminal, initiate a communication from the mobile communication terminal to another mobile communication terminal;
receive from the mobile communication terminal a selection of a sponsor financed communication application available at the apparatus to control said communication;

establish said communication using said sponsor financed communication application by transmitting one or more signaling messages, at least one of the signaling messages including one or more advertisements, wherein the one or more advertisements are unrelated to the another mobile communication terminal;

insert presentation of one or more of the advertisements at said mobile communication terminal, the another mobile communication terminal, or a combination thereof when said communication between the mobile communication terminal and the another mobile communication terminal is in progress; and charge the cost of said communication to a provider of said sponsor financed communication application.

2. The apparatus according to claim 1, wherein the sponsor financed communication application is provided by a communications service provider, telecommunications operator, or internet service provider and executed on a subscription or call by call basis.

3. The apparatus according to claim 1, wherein the apparatus is within a location server or a sponsor server.

4. The apparatus according to claim 3, wherein the location server is a mobile communication network server and the communication is a call using mobile communication protocols.

5. The apparatus according to claim 3, wherein the location server is an Internet server and the communication is a call using presence based protocols.

6. A method comprising:

initiating a communication by a mobile communication terminal to another mobile communication terminal by receiving a user selection of a sponsor financed communication application available to control said communication;

establishing said communication using said sponsor financed communication application by transmitting one or more signaling messages, at least one of the signaling messages including one or more advertisements, wherein the one or more advertisements are unrelated to the another mobile communication terminal;

inserting presentation of one or more of the advertisements at said mobile communication terminal, the another mobile communication terminal, or a combination thereof when said communication between the mobile communication terminal and the another mobile communication terminal is in progress; and charging the cost of said communication to a provider of said sponsor financed communication application.

7. The method according to claim 6 wherein said communication is established through a mobile communication network server using mobile communication protocols, or through an Internet server using presence based protocols.

8. The method according to claim 6 wherein the presentation of the one or more of the advertisements is triggered as part of said communication based upon a subscription for a term to automatically display the advertisements.

9. The method according to claim 6 wherein the sponsor financed communication application may be downloaded to the mobile communications terminal for execution thereon.

10. The method according to claim 6, wherein the sponsor financed communication application is resident on a location server or a sponsor server for access by said mobile communication terminal for execution of said sponsor financed communication application on said location server or said sponsor server.

11. The method according to claim 6, wherein the presentation of the one or more of the advertisements is triggered by at least one of an off-line message, a calendar notification, an alarm and user-initiated advertisement browsing.

12. A non-transitory computer-readable storage medium carrying one or more sequences of one or more instructions which, when executed by one or more processors, cause an apparatus to at least perform the following steps:

initiating a communication to a mobile communication terminal by receiving a user selection of a sponsor financed communication application available to control said communication;

establishing said communication using said sponsor financed communication application by transmitting one or more signaling messages, at least one of the signaling messages including one or more advertisements, wherein the one or more advertisements are unrelated to the mobile communication terminal;

inserting presentation of one or more of the advertisements at the apparatus, the mobile communication terminal, or a combination thereof when said communication between the apparatus and the mobile communication terminal is in progress; and charging the cost of said communication to a provider of said sponsor financed communication application.

13. The non-transitory computer-readable storage medium according to claim 12, wherein when the sponsor financed communication application is available to be downloaded, the apparatus is caused to further perform: accessing a location server or a sponsor server to download the sponsor financed communication application.

14. The non-transitory computer-readable storage medium according to claim 12, wherein the sponsor financed communication application is resident on a location server or a sponsor server, and the apparatus is caused to further perform: accessing and executing said sponsor financed communication application thereon.

15. The non-transitory computer-readable storage medium according to claim 12, wherein the triggering event includes at least one of an off-line message, a calendar notification, an alarm and user-initiated advertisement browsing.

16. The non-transitory computer-readable storage medium according to claim 12, wherein the communication is using mobile communication protocols or presence based protocols.

17. The non-transitory computer-readable storage medium according to claim 12, wherein the one or more of the advertisements is triggered as part of said communication based upon a subscription for a term to automatically display the advertisements.

18. The non-transitory computer-readable storage medium according to claim 12, wherein the apparatus is caused to further perform: sending an acknowledgement to a sponsor server upon completion of the additional advertisement presentation and causing the sponsor server to award a communication credit to the user at a predetermined rate.

19. An apparatus comprising:

at least one processor; and at least one memory including computer program code, the at least one memory and the computer program code configured to, with the at least one processor, cause the apparatus to perform at least the following, initiate a communication to a mobile communication terminal by receiving a user selection of a sponsor financed communication application available to control said communication;

establish said communication using said sponsor financed communication application by transmitting one or more signaling messages, at least one of the signaling messages including one or more advertisements, wherein the one or more advertisements are unrelated to the mobile communication terminal;

insert presentation of one or more of the advertisements at the apparatus, the mobile communication terminal, or a combination thereof when said communication between the apparatus and the mobile communication terminal is in progress; and charge the cost of said communication to a provider of said sponsor financed communication application.

20. The apparatus according to claim 19, wherein additional advertisements are downloaded from a sponsor server, and wherein the apparatus is further caused to send an acknowledgement to the sponsor server upon completion of the additional advertisement presentation and to cause the sponsor server to award a communication credit to the user at a predetermined rate.

21. A user interface comprising:
a display;
a memory for storing an application module; and
a control unit connected to the memory and display, the control unit being configured to:
initiate a communication from a mobile communication terminal comprising the user interface to another mobile communication terminal, by receiving a user selection of a sponsor financed communication application available to control said communication;
establish said communication using said sponsor financed communication application by transmitting one or more signaling messages, at least one of the signaling messages including one or more advertisements, wherein the one or more advertisements are unrelated to the another mobile communication terminal;
insert presentation of one or more of the advertisements at the apparatus, said mobile communication terminal, or a combination thereof when said communication between the apparatus and the mobile communication terminal is in progress; and
charge the cost of said communication to a provider of said sponsor financed communication application.

22. The user interface of claim 21, wherein the control unit is further configured to present the advertisements in a notification of a communication initiated by or received in the mobile communication device.

23. The user interface of claim 21, wherein the one or more of the advertisements is triggered as part of said communication based upon a subscription for a term to automatically display the advertisements.

24. The user interface of claim 21, wherein the triggering event includes at least one of an off-line message, a calendar notification, an alarm and user-initiated advertisement browsing.

25. The user interface of claim 21, wherein the control unit is further configured to present, on the display, a selection of advertisements when a communication is initiated in the mobile communication device.

26. The user interface of claim 21, wherein the control unit is further configured to present, on the display, options for setting the form, content, length and placement of the advertisements within the communication.

27. The user interface of claim 21, wherein the control unit is configured to present the advertisements in a same window where a communication notification is shown.

28. The user interface of claim 27, wherein a number shown in the same window where the communication notification is shown is associated with the advertisements.

29. The user interface of claim 21, further comprising:
a software module including a sponsor advertising package, the software module being configured to enable insertion of selected advertisements before, during or after a communication is made in the mobile communication device;
wherein the control unit is further configured to provide visual data stored in the mobile communication device and execute software included in the software module, and provides a space on the display for indicating a sponsor name, logo, and/or identifier associated with the visual data.

30. The method according to claim 6, wherein additional one or more of the advertisements are presented during a communication signaling process and before said communication is established.

31. The method according to claim 30, wherein the additional one or more of the advertisements are presented in parallel with a communication establishing menu.

32. The method according to claim 31, wherein the one or more of the advertisements display a name, logo or identifier of the sponsor.

33. The method according to claim 6, further comprising: before establishing said communication, causing, at least in part, displaying of options of one or more forms, content, lengths, placements, or a combination thereof, of the one or more advertisements as offered by the selected sponsored financed communication application.

34. The method according to claim 6, further comprising: notifying the another mobile communication terminal the sponsor of an incoming call or message, before establishing said communication.

35. The method according to claim 6, further comprising: downloading one or more sponsored financed communication applications at the mobile communication terminal, before receiving a user selection of a sponsor financed communication application.

36. The method according to claim 6, wherein the mobile communication terminals transmit in-between voice data, visual data, or a combination thereof, when the communication is in progress.

* * * * *